United States Patent

Ban

[15] 3,684,296

[45] Aug. 15, 1972

[54] TAPE CARTRIDGE POSITIONING APPARATUS

[72] Inventor: Itsuki Ban, 829, Higashi-Oizumimachi, Nerima-ku, Tokyo-to, Japan

[22] Filed: May 5, 1970

[21] Appl. No.: 34,825

[52] U.S. Cl..................274/4 B, 179/100.2 Z, 226/90

[51] Int. Cl..............................................G11b 15/29

[58] Field of Search.....274/4 B, 4 F, 4 E, 11 B, 11 E; 242/55.19 A, 180, 181, 200, 197, 198, 199; 179/100.2 Z; 353/15; 226/90

[56] References Cited

UNITED STATES PATENTS

| | | | |
|---|---|---|---|
| 3,009,024 | 11/1961 | Eash | 274/4 B |
| 3,083,269 | 3/1963 | Gaubert | 274/11 E |
| 3,126,162 | 3/1964 | MacKenzie | 242/55.19 A |
| 3,431,367 | 3/1969 | Mickl | 274/4 F |
| 3,556,535 | 1/1971 | Chabot | 274/4 F |

*Primary Examiner*—Leonard Forman

*Assistant Examiner*—Dennis A. Dearing

*Attorney*—Jacobs & Jacobs

[57] ABSTRACT

A tape cartridge positioning apparatus for an endless magnetic tape cartridge player, comprising a cartridge moving lever engageable with a tape cartridge laterally inserted in a player housing for moving the cartridge from a non-play position into a play position and back into the non-play position, a lever moving device for reciprocally moving the cartridge moving lever by use of rotational force of the magnetic tape, and a control device for controlling operation of the lever moving device and wherein the control device permits of operation of the lever moving device to allow the cartridge moving lever to move from a first position to a second position to thus move the cartridge into a play position and to play the cartridge, and then the control device again permits of operation of the lever moving device to allow the cartridge moving lever to move from the second position into the first position whereby the cartridge is moved into the non-play position to end the play of the cartridge.

5 Claims, 2 Drawing Figures

TAPE CARTRIDGE POSITIONING APPARATUS

BACKGROUND OF THE INVENTION

This invention relates to an endless magnetic tape cartridge player, and more particularly to a novel tape cartridge positioning apparatus for automatically positioning an endless magnetic tape cartridge insertable in the player in a play position and for automatically moving the cartridge from the play position into the non-play position when the play of the cartridge is ended.

A conventional tape cartridge player is arranged so that the cartridge to be inserted in the player is located in the play position by use of a notch formed on the side wall of the endless magnetic tape cartridge. In this instance, the player is provided with a retention roller which is received in the notch on the cartridge. The retention roller is caused to press the inclined wall of the notch under the influence of a spring, however, a weak bias of the spring does not obtain enough abutment force between a pinch roller thereby resulting in lack of stability of the tape running speed to produce wow-flutter which deteriorate the tone quality to be reproduced. A stronger resilient force requires more power when the cartridge is taken out of the player for ending the play of the cartridge. As described above, disadvantage derived from the use of the cartridge positioning apparatus in a conventional tape cartridge player is that more power is required to effect insertion and withdrawal of the cartridge if the cartridge is stably located in the play position whereas when less power is required, the cartridge is not stably located in the play position to deteriorate the tone quality to be produced. Further, the cartridge to be used must be one that is provided with a certain notch formed in a certain position. This is thus very inconvenient for the user with respect to its convertibility. In addition, according to the conventional arrangement, the cartridge is longitudinally inserted in the play position in the player housing to cause the rear edge of the cartridge to project from the front panel of the player thereby being a possible source of injury should one accidentally bang into the player. For this reason, to mount such the cartridge on a vehicle or the like is not desirable. The cartridge player of the type which longitudinally receive the cartridge in the play position in the player, is adapted to locate a magnetic head adapted to transduce the tape in the innermost position in the player housing so that it is very difficult to check and wipe out a spot or stain on the magnetic head. For cleaning such spot, a specific tool is required which is thus inconvenient.

The inventor has succeeded in obtaining a novel tape cartridge positioning apparatus which enable the cartridge to be laterally inserted in the player housing thereby overcoming the aforementioned shortcoming.

SUMMARY OF THE INVENTION

It is a primary object of the present invention to provide a tape cartridge positioning apparatus for an endless magnetic tape cartridge player, wherein a tape cartridge is laterally inserted in a player housing and automatically moved into a play position and back from the play position into a non-play position to end the play of the cartridge.

Another object of the invention is to provide a tape cartridge positioning apparatus for an endless magnetic tape cartridge player, having a cartridge moving lever engageable with a tape cartridge laterally inserted in the player housing for moving the cartridge from a non-play position into a play position and back into the non-play position and reciprocally movable in the direction perpendicular to the insertable movement of the cartridge, the cartridge moving lever being reciprocally moved by use of a rotational force of a rotary capstan for driving the tape in the cartridge.

Still another object of the invention is to provide a tape cartridge positioning apparatus for an endless magnetic tape cartridge player, wherein movement of the cartridge moving lever is automatically arrested under operation of a control means at a position where the lever moving means moves the cartridge moving lever to a second position in which the cartridge is located in the play position whereas movement of the cartridge moving lever is automatically arrested under operation of the control means at a position where the lever moving means moves the cartridge moving lever to a first position in which the cartridge is located in the non-play position.

Yet another object of the invention is to provide a tape cartridge positioning apparatus for an endless magnetic tape cartridge player, wherein in response to operation of a start switch for instructing initiation of the play of the cartridge, the cartridge is automatically moved in the play position by means of the cartridge moving lever and then played whereas in response to operation of a stop switch for instructing termination of the play of the cartridge, the cartridge is automatically moved to the non-play position to end the play of the cartridge.

According to the present invention, the tape cartridge is automatically reciprocated between the play position and the non-play position whereby little effort is required to insert or withdraw the cartridge in or from the player, and the cartridge may be located in the play position without relying on a notch or the like, thereby to provide much convertibility for the cartridge. Since the cartridge is laterally inserted in the player housing there is no portion projecting from the player housing, there is no harm to human body, and the magnetic head is located adjacent an opening in the player housing to readily check a spot or stain on the head and wipe out the same. This apparatus may be economically manufactured since the cartridge moving lever is adapted to be moved by use of a rotational force of the capstan.

These and other objects of the invention will be apparent from the following description and accompanying drawing in which;

DESCRIPTION OF THE PREFERRED EMBODIMENTS

Figure 1:
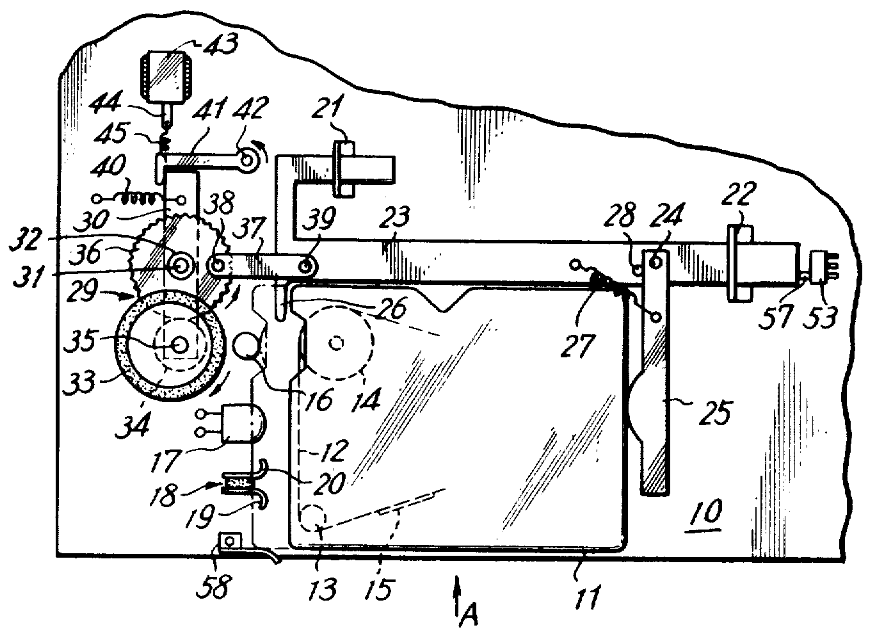
FIG. 1 is a representation schematically showing an embodiment of a tape cartridge positioning apparatus according to the invention.

Referring now to the drawings, and in particularly to FIG. 1, the reference numeral 10 indicates a horizontal deck which is provided within a player housing (not shown) for a tape cartridge player playing an endless magnetic tape cartridge 11. The cartridge 11 include a generally rectangular housing with a centrally disposed reel (not shown) on which an endless magnetic tape 12 is wound and unwound in conventional manner. The tape 12 passes over a guide 13 and a pinch roller 14. The guide 13 and the pinch roller 14 are disposed adjacent the leading edge of the cartridge whereat the cartridge side wall is cutaway or dispensed with and the tape 12 is extended from the center of the hub of the reel (not shown) about the guide 13 and thence about the pinch roller 14 back to outer periphery of a roll formed by the tape wound about the hub. The tape 12 is provided with a conductive patch or an endmark 15 thereon.

Much of the mechanism disposed beneath the deck 10 is omitted since it forms no part of the present invention. However, there shown on the deck 10 are a capstan 16 for driving the tape 12, a magnetic head 17 adapted to transduce the tape and an endmark detector 18. The capstan 16 is rotatably supported by a suitable bearing (not shown) mounted to the deck 10 thereunder and upwardly extends through a hole (not shown) bored through the deck. The capstan 16 is adapted to be rotatably driven by an electrical motor (not shown). The endmark detector 18 includes a pair of feeler contacts 19, 20 which are electrically separated from each other and shorted by the conductive patch 15 on the tape 12.

In a conventional endless magnetic tape cartridge player, the tape cartridge is longitudinally inserted in the cartridge player to allow the leading edge thereof to pass through an opening in the player housing. In contrast, according to the present invention, the tape cartridge is adapted to be laterally inserted in the cartridge player. For this reason, the opening in the player housing (not shown) is in a laterally elongated form and dimensioned to receive the cartridge laterally.

The tape cartridge positioning apparatus according to the present invention includes a cartridge moving lever 23 slidably supported by guides 21 and 22 fixed to the deck 10. The lever 23 is provided for moving the cartridge 11 which is inserted in the player housing from the direction of arrow A and is laid on the deck 10 toward the play position where the pinch roller 14 abuts against the capstan 16. Pivoted on a pin 24 at one portion of the lever 23 is a rear arm 25, and a front arm 26 projects from the other portion thereof. The rear arm 25 is biased in the clockwise direction by a spring 27 but inward movement of the rear arm is limited by a stopper pin 28 on the lever 23. When the lever 23 is in a first position as shown in FIG. 1, the cartridge which is inserted in the direction of arrow A and rests on the deck 10, is interposed between the rear arm 25 and the front arm 26. FIG. 1 shows the cartridge in a non-play position.

A lever moving means generally indicated by numeral 29 is shown for moving the lever 23 in the direction perpendicular to the direction of arrow A permitting the cartridge 11 to move from the non-play position into a play position where it is played by the capstan 16 and the magnetic head 17, and back into the non-play position. The lever moving means 29 includes a swing lever 30 which is swingably provided by a sleeve 32 over a shaft 31 on the deck 10. A rubber covered eccentric frictional idler wheel 33 and a gear 34 connected to each other are rotatably supported on an axis 35 on the swing lever 30. The wheel 33 as will be described later is caused to abut against the capstan 16 by rotation of the swing lever 30 from the position as shown to the counterclockwise direction and is rotatably driven by the capstan. A gear 36 or rotatary member is rotatably mounted to the shaft 31 to mesh with the gear 34. The ratio of the gears 34 and 36 is determined so that rotation of the gear 34 through a turn allows the gear 36 to rotate through a half-turn. The gear 36 is connected to the cartridge moving lever 23 by a link 37 which has a pin 38 at its one end mounted eccentrically of the center axis of the gear 36 and a pin 39 at the other end pivoted to the lever 23. With this arrangement, the gear 36 is rotated through a turn to reciprocally move the cartridge moving lever 23 in aid of the link 37.

Figure 2:
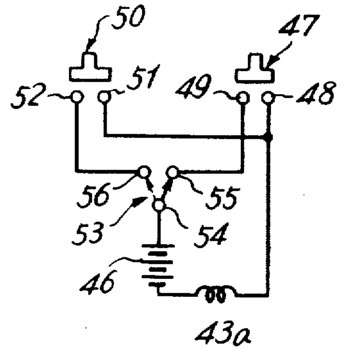
FIG. 2 is a diagram showing a control circuit for the solenoid in FIG. 1.

The swing lever 30 is intended to be counterclockwise biased by a spring 40, however, movement of the swing lever due to the spring 40 is normally arrested by a substantially L-shaped stopper lever 41 one end of which is pivoted by a pin 42 mounted to the deck 10. The stopper lever 41 is biased by a spring (not shown) in the direction of the arrow as shown so as to maintain engagement relationship with the one end portion of the swing lever 30. The stopper lever 41 is connected by a spring 45 to a plunger 44 for a solenoid 43 mounted to the deck 10 and is adapted to swingably move to disengage it from the swing lever 30 when the solenoid 43 is energized. A control circuit for the solenoid 43 and an exiting coil 43a for the solenoid 43 are shown in FIG. 2. The coil 43a has one end connected to a power source 46 at one of the electrodes and the other end connected to one contact 48 of a manually operated normal-opened start switch 47 for instructing initiation of the play of the tape cartridge and to the other contact 49 of a manually operated normal-opened stop switch 50 for instructing termination of the play of the cartridge. The other contact 49 of the start switch 47 is connected to one fixed contact 55 of a changing switch 53 which is provided on the deck and actuated by the cartridge moving lever 23 while the other contact 52 of the stop switch 50 is connected to the other contact 56 of the changing switch 53. The switch 53 is selectively connected to the contact 55 or 56 and includes a common movable contact 54 connected to the other electrode of the power source 46. An actuator 57 for the changing switch 53 is depressedly operated by the lever 23 when in the first position to thus allow the movable contact 54 to come in contact with the contact 55 as shown in FIG. 2 whereby the lever 23 is leftwardly moved from the first position to release operation of the actuator 57 and at the same time the movable contact 54 moves away from the contact 55 and comes in contact with the contact 56.

Operation of the apparatus shown in FIGS. 1 and 2 will be apparent from the following description.

Now, where the cartridge 11 is inserted in the player housing as shown in FIG. 2, manual operation of the start switch 47 allows it to contact with the contacts 48, 49 to apply the current from the power source 46 to the coil 43a of the solenoid 43 thereby actuating the solenoid. Accordingly, the stopper lever 41 is swingably moved by the solenoid 43 to establish disengagement with the swing lever 30. The swing lever 30 disengaged from the stopper lever 41 is swung by the bias of the spring 40 into a position where the eccentric frictional idler wheel 33 abuts against the capstan 16. The wheel 33 which abuts against the capstan 16 is rotatably driven by the capstan in the direction of arrow as shown. In this connection, it is noted that since rotation of the wheel 33 is eccentrically made, the wheel 33 makes one revolution whereas the swing lever 30 makes one reciprocally swingable movement. Since the minimum eccentricity portion of the wheel 33 is pressed against the capstan 16, the swing lever 30 is clockwise swung as the wheel is rotated. When the wheel 33 makes a half-revolution to allow the maximum eccentricity portion to pass over the capstan 16, swingable movement of the swing lever 30 is reversed to assume counterclockwise direction. Just prior to one revolution of the wheel 33, the swing lever 30 engages the stopper lever 41 and is prevented from its swingable movement. Therefore, abutment force of the wheel 33 with the capstan 16 derived from the bias of the spring 40 is thus diminished to slightly rotate the wheel 33. And, the wheel 33 makes a revolution from the initial position and automatically stops its rotation. During the time that the wheel 33 is stopped, the wheel 33 comes in contact with the capstan 16 to the extent that it does not receive a rotational force from the capstan 16, and the wheel 33 is slipped with respect to the capstan 16. However, for the illustrative purpose that the wheel 33 is in a position where it is not rotatably driven by the capstan, a space between the wheel 33 and the capstan is shown exaggerated in FIG. 1.

Rotation of the wheel 33 is imparted through the gear 34 to the gear 36 to rotate the latter in the direction of the arrow as shown. As the gear 36 is rotated, the cartridge moving lever 23 is moved through the link 37 from the first position to the leftward direction. Termination of rotation of the wheel upon one revolution stops rotation of the gear 36 after a half-revolution at the same time movement of the lever 23 is stopped to locate the lever 23 in the second position. During the time that the lever 23 is moved from the first position into the second position, the rear edge of the cartridge 11 is pressed by the arm 25 and advances from the non-play position and guided by a guide member 58 moving into the play position. The cartridge 11 is moved into the play position before the lever is moved into the second position. Accordingly, the lever 23 is moved into the second position at which time the rear arm 25 is counterclockwise rotated against the bias of the spring 27 to obtain abutment force between the pinch roller 14 and the capstan 16 in the cartridge 11 moved into the play position. FIG. 1 shows the cartridge which is moved into the play position indicated by the dot and dash lines.

Movement of the lever 23 from the first position to the second position changes over the changing switch 53 to allow the movable contact 54 to engage the fixed contact 56 as shown by the dotted lines. Consequently, in the play of the cartridge, the solenoid 43 is not energized even if the start switch 47 is operated.

When the stop switch 50 is closed so as to end the play of the cartridge, the solenoid 43 is energized to move the stopper lever 41 to establish disengagement from the swing lever 30. In response to this, the wheel 33 abuts against the capstan 16 and is thus rotated and makes one revolution as mentioned above to stop its rotation. One revolution of the wheel rotates the gear 36 through a half revolution, on the other hand, the lever 23 is returned from the second position to the first position. When the lever 23 is returned to the initial position, the front edge of the cartridge 11 which is in the play position and played, is pressed by the front arm 26 and moved back into the non-play position. As the lever 23 is returned to the first position, the actuator 57 of the changing switch 53 is operated by the lever 23 and the movable contact 54 engages the fixed contact 55. Nextly, the solenoid 43 is prepared for its energization when the start switch 47 is depressedly operated.

Control of current supply to the solenoid 43 may be effected by one switch, however, the start switch 47, the stop switch 50, and the changing switch 53 may be preferably used to instruct initiation and termination of the cartridge's play without fail.

Although the invention has been described with reference to specific embodiments, it is apparent that the invention is not to be limited to the embodiments as illustrated, and, accordingly, changes and variations may be made without departing from the spirit and scope of the invention as defind in the appended claims.

What is claimed is:

1. A tape cartridge positioning apparatus for an endless magnetic tape cartridge player, the player including a player housing with an opening through which an endless magnetic tape cartridge is laterally inserted, and a deck in the player housing on which the cartridge is deposited and to which are mounted a rotary capstan for driving the tape in the cartridge and at least one magnetic head for audibly reproducing the tape, comprising: a cartridge moving lever on said player deck reciprocally movable in a direction parallel to the plane of the deck and perpendicular to the path of insertion and removal of said cartridge, said cartridge moving lever being movable to and from two positions and having means for engaging a cartridge inserted in the player housing to move the cartridge from a non-play position to a play position where the tape in the cartridge is driven by the capstan and played back by the magnetic head and back to the non-play position; a lever moving means for moving the cartridge moving lever from a first lever position where it engages a cartridge in the non-play position to a second lever position where the engaged cartridge is moved to the play position and for returning the cartridge moving lever from the second position to the first position, said lever moving means including a swing lever swingable provided on the deck, an eccentric frictional wheel rotatably mounted on the swing lever and operable to be rotatably driven by abutment with the capstan in relation to swingable movement of the swing lever, a rotary member in contact with and rotated by rotation of said wheel and operable to make a half revolution in response to every one revolution of said wheel, a link member having ends which are pivoted to a point offset from the center of the rotary member and to a point of the cartridge moving lever for connecting the rotary member with the cartridge moving lever, and a spring member for biasing the swing lever in a direction where the wheel abuts against the capstan; a control means for controlling operation of the lever moving means, said control means having a stopper lever movable between a first stopper lever position where it may engage the swing lever and thereby arrest movement of the swing lever and a second stopper lever position where the swing lever and stopper lever are disengaged, a solenoid operable when energized to move the stopper lever from the first stopper lever position to the second stopper lever position and establish disengagement of the stopper lever from the swing lever, and a control circuit for controlling current supply to the solenoid, the stopper lever when in said second position preventing the wheel to fully contact the capstan to thereby stop rotation of the wheel, said stopper lever being operable, when said solenoid is energized, to be disengaged from said swing lever and to re-engage said swing lever at the end of each full revolution of said wheel, said rotary member being operable to move said cartridge moving lever from said first lever position to said second lever position when said rotary member is rotated through a half-revolution by said wheel being rotated through one revolution and to return said cartridge moving lever to said first lever position when said rotary member is rotated through its next half-revolution by said wheel being rotated through its next revolution.

2. A tape cartridge positioning apparatus for an endless magnetic tape cartridge player in accordance with claim 1, wherein said engaging means of said cartridge moving lever is provided by a front arm and a rear arm to grasp said cartridge, the rear arm being operable to press the rear edge of the cartridge to move the latter to said play position when the cartridge moving lever is moved from said first lever position to said second lever position, the front arm being operable to press the leading edge of the cartridge to move the latter to said non-play position when the cartridge moving lever is moved from said second lever position to said first lever position.

3. A tape cartridge positioning apparatus for an endless magnetic tape cartridge player in accordance with claim 2, wherein said rear arm is swingable and biased by a spring in a direction to press against the rear edge of the cartridge, rotational force of the rear arm by said spring being arrested by a stopper member at a position where the rear arm is parallel to the front arm, the rear arm being rotated against the bias of said spring when said cartridge moving lever is moved into said second lever position and the cartridge is moved into the play position, the rear arm being operable to bring the cartridge into the play position under the influence of said spring.

4. A tape cartridge positioning apparatus for an endless magnetic tape cartridge player in accordance with claim 1, wherein a gear is coaxially mounted with said eccentric frictional wheel and is arranged to rotate therewith, and said rotary member is a gear member, the gear ratio of said gear member to said gear being 2:1.

5. A tape cartridge positioning apparatus for an endless magnetic tape cartridge player in accordance with claim 1, wherein said control circuit includes a power source for energizing said solenoid, a manually operated normal-opened start switch for instructing initiation of the play of the cartridge, a manually operated normal-opened stop switch for instructing termination of the play of the cartridge, and a changing switch actuable by said cartridge moving lever and changeable over to a first situation when the lever is in said first lever position and to a second situation when the lever is in said second lever position, the start switch being operable to be closed when the changing switch is in the first situation to enable flow of current from the power source through the start switch and the changing switch to the solenoid, the stop switch being operable to be closed when the changing switch is in the second situation to enable flow of current from the power source through the stop switch and the changing switch to the solenoid.

* * * * *

PO-1050
(5/69)

UNITED STATES PATENT OFFICE
CERTIFICATE OF CORRECTION

Patent No. 3,684,296 Dated August 15, 1972

Inventor(s) Itsuki Ban

It is certified that error appears in the above-identified patent and that said Letters Patent are hereby corrected as shown below:

In the title page, left column, insert:

-- claims priority from Japanese Patent Application 41579/1969, filed in Japan on May 8, 1969. --

Signed and sealed this 30th day of January 1973.

(SEAL)
Attest:

EDWARD M.FLETCHER,JR.
Attesting Officer

ROBERT GOTTSCHALK
Commissioner of Patents